United States Patent [19]
Cho

[11] Patent Number: 4,944,772
[45] Date of Patent: Jul. 31, 1990

[54] FABRICATION OF SUPPORTED POLYCRYSTALLINE ABRASIVE COMPACTS

[75] Inventor: Hyun S. Cho, Sandy, Utah
[73] Assignee: General Electric Company
[21] Appl. No.: 277,874
[22] Filed: Nov. 30, 1988
[51] Int. Cl.5 .............................................. B24D 3/00
[52] U.S. Cl. ........................................ 51/293; 51/295; 51/309
[58] Field of Search ........................... 51/293, 295, 309

[56] References Cited

U.S. PATENT DOCUMENTS

| | | | |
|---|---|---|---|
| 3,141,746 | 7/1964 | De Lai | 51/309 |
| 3,407,445 | 10/1968 | Strong | 51/307 |
| 3,743,489 | 7/1973 | Wentrof, Jr. et al. | 51/309 |
| 3,745,623 | 7/1973 | Wentrof, Jr. | 51/307 |
| 3,767,371 | 10/1973 | Wentrof, Jr. et al. | 51/309 |
| 4,188,194 | 2/1980 | Corrigan | 51/309 |
| 4,224,380 | 9/1980 | Bovenkerk et al. | 51/309 |
| 4,673,414 | 6/1987 | Lavens et al. | 51/293 |

Primary Examiner—Paul Lieberman
Assistant Examiner—W. Thompson

[57] ABSTRACT

Disclosed is a process for fabricating a supported polycrystalline diamond or CBN bi-layer compact which comprises forming a sintered polycrystalline or CBN compact which preferably is a thermally-stable compact. A cemented carbide support is separately formed. The compact and the support then are mated with a layer of diamond or CBN crystals having the largest dimension of between about 30 and 500 micrometers interposed therebetween. A source of catalyst/sintering aid material is provided in association with the layer of interposed crystals. The entire assembly then is subjected to HP/HT conditions and for a time adequate for converting the diamond or CBN crystals into a polycrystalline diamond or CBN layer and for producing the bi-layer supported compact of the present invention.

12 Claims, 1 Drawing Sheet

FABRICATION OF SUPPORTED POLYCRYSTALLINE ABRASIVE COMPACTS

BACKGROUND OF THE INVENTION

The present invention relates to the fabrication of supported polycrystalline diamond or cubic boron nitride (CBN) compacts and especially to the preparation of such compacts utilizing thermally-stable polycrystalline diamond and CBN compacts.

Well known in the super abrasive art are compacts of polycrystalline abrasive particles typified by polycrystalline diamond and polycrystalline CBN compacts. Such compacts are represented by U.S. Pat. Nos. 3,745,623 and 3,608,818 with respect to polycrystalline diamond compacts and U.S. Pat. Nos. 3,767,371 and 3,743,489 with respect to polycrystalline CBN compacts. A supported polycrystalline compact is a compact attached to a reinforcing or substrate material, such as cemented metal carbide. In one configuration referred to as a supported wire die compact, a core of polycrystalline diamond or CBN is jacketed by an annulus or support of, for example, cemented carbide or stainless steel.

While such polycrystalline compacts represent a significant contributioon to the art in many fields of use, thermal degradation at an elevated temperature, e.g. above about 700° C., limited their usefulness, especially in metal matrix bond applications. Thermal stability of such polycrystalline compacts was improved with the advent of thermally-stable, porous self-bonded diamond and CBN compacts containing less than about 3% non-diamond phase, hereinafter termed "porous compacts". Compacts of this type are the subject of U.S. Pat. Nos. 4,224,380 and 4,288,248.

For purposes of the present invention, so-called "direct conversion" CBN compacts are deemed to be thermally-stable. Direct conversion CBN compacts are disclosed in U.S. Pat. No. 4,188,194 and are made from preferentially oriented pyrolytic hexagonal boron nitride in the substantial absence of catalytically active materials. For purposes of the present invention, "re-sintered" polycrystalline CBN compacts also are thermally-stable. Re-sintered polycrystalline CBN compacts are taught in U.S. Pat. No. 4,673,414 and are made by re-sintering catalyst-free boron-rich polycrystalline cubic boron nitride particles under appropriate high pressure/high temperature (HP/HT) conditions.

European patent publication No. 116,403 describes a thermally-stable diamond compact comprising a mass of diamond particles present in an amount of 80-90% by volume of the body and a second phase present in an amount of 10-20% by volume of the body, the mass of diamond particles containing substantially diamond-to-diamond bonding to form a coherent skeletal mass and the second phase containing nickel and silicon, the nickel being in the form of nickel and/or nickel silicide and the silicon being in the form of silicon, silicon carbides, and/or nickel silicide. British patent application No. 8508295 describes a thermally-stable diamond compact comprising a mass of diamond particles present in an amount of 80-90% by volume of the compact and a second phase present in an amount of 10-20% by volume of the compact, the mass of diamond particles containing substantially diamond-to-diamond bonding to form a coherent skeletal mass and the second phase consisting essentially of silicon, the silicon being in the form of silicon and/or silicon carbide.

Diamond, synthetic or natural, is very difficult to wet, making the attachment of diamond to a variety of substrates difficult. Since thermally-stable compacts, and especially porous compacts, essentially are composed only of diamond or CBN (i.e. are substantially metal-free), they are difficult to bond to cemented carbide supports, for example. Bonding thermally stable compacts to carbide supports utilizing brazing alloys has been proposed, for example, in British Pat. No. 2,163,144 and in commonly-assigned U.S. Ser. No. 07/158,575, filed Feb. 22, 1988. Commonly-assigned U.S. Ser. No. 06/818,850, filed Jan. 14, 1986, now U.S. Pat. No. 4,797,326, on the other hand, proposes to separately form a sintered polycrystalline diamond or CBN compact, and a plastically deformable support, such as a cemented metal carbide support. The pre-sintered compact and support are mated and subjected to elevated temperature and pressure conditions sufficient to plastically deform the support surface into attachment with the compact surface. The process is especially adapted to attaching thermally-stable compacts to cemented metal carbide supports and may make use of an interface binder disposed between the respective surfaces being mated. Such interface binder may be a catalyst/sintering aid for the polycrystalline thermally-stable compact subjected to the bonding process.

BROAD STATEMENT OF THE INVENTION

The present invention is directed to a process for fabricating a supported polycrystalline diamond or CBN compact in general, though such process is especially adapted to the fabrication of a thermally-supported polycrystalline diamond or CBN compact. The process comprises forming a sintered polycrystalline diamond or CBN compact having a surface and separately forming a cemented carbide support having a support surface. The compact and support then are mated at their respective surfaces with a layer of diamond or CBN crystals having the largest dimension of between about 30 and 500 micrometers interposed between said surfaces. Also, a source of diamond or CBN catalyst/sintering aid material is associated with the layer of diamond or CBN crystals. The mated compact and support then are subjected to HP/HT conditions and for a time adequate for converting said diamond or CBN crystals into a polycrystalline diamond or CBN compact and for producing a supported polycrystalline compact of at least two polycrystalline layers (i.e. bi-layer compact). Preferably, thermally-stable compacts are used in the process. For present purposes, polycrystalline diamond compacts are termed "thermally stable" by being able to withstand a temperature of about 1200° C. in a vacuum without any significant structural degradation of the compact occurring. Such polycrystalline diamond compacts are comprised of a polycrystalline mass of diamond particles present in an amount of at least 70% by volume.

Another aspect of the present invention comprises a supported polycrystalline diamond or CBN compact comprising a polycrystalline diamond or CBN compact bound to a cemented carbide support through an intermediate polycrystalline mass of abrasive crystal grains being derived from diamond or CBN crystals having the largest dimension of between about 30 and 500 microns. The polycrystalline diamond or CBN compact being supported can be a conventional compact or a thermally-stable compact, and preferably will be a porous compact, a re-sintered CBN compact, or a direct conversion CBN compact.

Advantages of the present invention include the ability to fabricate supported thermally-stable compacts. Another advantage is the ability to reject non-conforming compacts in the pre-formed state rather than in the final supported state. Another advantage is the ability to fabricate supported polycrystalline compacts made from very fine grain diamond or CBN crystals, including relatively large fine-grain polycrystalline compacts. These and other advantages will be readily apparent to those skilled in the art based upon the disclosure contained herein.

DETAILED DESCRIPTION OF THE INVENTION

Figure 1:
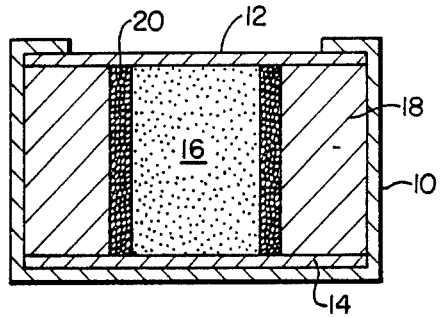
FIGS. 1-5 depict cross-sectional elevational views of five different reaction cell or assembly configurations for producing the novel supported polycrystalline compacts of the present invention. The drawings depict right cylindrical configurations and annular wire drawing die configurations of the supported polycrystalline compacts of the present invention. The drawings will be described in fuller detail below.

The intermediate diamond or CBN particle layer interposed between the carbide support and sintered polycrystalline compact and which is converted to a polycrystalline layer during the fabrication process can be relatively thick in dimension with the thickness being limited only by HP/HT cell design and the ability to effect sweep-through with the catalyst/sintering aid for forming the intermediate polycrystalline layer. Of more practical interest, especially commercially, is the minimum thickness of the intermediate or transition layer. Since conventional polycrystalline compacts can be bonded to carbide supports with relatively less difficulty, the present invention takes on added significance by being able to support thermally-stable compacts with intimate conforming and interlocking bonds. In this regard, thermally-stable compacts, especially porous compacts, possess thermal characteristics which make them particularly useful in a variety of applications. An intermediate polycrystalline layer containing a second phase of metal catalyst/sintering aid and being relatively thick presents a standard compact with thermal limitations which thermally-stable compacts were designed to overcome. Thus, in order to obtain the maximum benefits of using thermally-stable compacts, a minimum intermediate polycrystalline layer thickness is desired. Such minimum thickness, however, should be tempered with the realization that good bonding is desirable. Thus, the minimum thickness of the intermediate crystalline layer can be thought of in terms of a single crystal or monocrystal layer having a thickness of about the largest dimension of the crystals, viz. between about 30 and 500 micrometers or microns. For maximum bonding, such intermediate crystalline layer should be continuous along the interface of the supporting substrate.

The intermediate crystalline layer provides a transition between the carbide support and the thermally-stable compact. Metal/sintering aid material which aids in forming the intermediate polycrystalline layer does not penetrate substantially into the thermally-stable compact but probably does assist in achieving bonding between the intermediate polycrystalline layer and the compact being supported.

Of obvious importance in the process are the temperature and pressure of operation maintained during the fabrication. The temperature and pressure must be adequate for converting the crystals into their corresponding polycrystalline layer. Thus, HP/HT conditions within the diamond stable or CBN stable region of the temperature/pressure phase diagram need to be maintained. Tempering use of conditions is the fact that a sintered polycrystalline compact is being subjected to the fabrication conditions. Conditions, then, should be inadequate to cause damage to the thermally-stable or other polycrystalline abrasive compact being supported by the fabrication process. Of course, conditions of operations will be substantially preclusive to graphitization of the diamond or reconversion of cubic boron nitride to its hexagonal or other form. Broadly, for diamond, the temperature will range from between about 1,000° to about 2,000° C. at a pressure which may be in excess of 40 Kbars (e.g. 40-80 Kbars). For CBN, similar temperatures and pressures apply. Within such stable regions, conditions of temperature and pressure typically will be on the lower ends of the ranges as the polycrystalline campacts already are sintered. In this regard, the process is practiced for time periods which are typically not protracted.

Preferably, then for polycrystalline diamond compacts, pressures of about 40-60 Kbars may be used along with a temperature of about 1,000°-1500° C. The same conditions apply generally for CBN compacts. Since less demanding processing parameters are required, especially for relatively thin intermediate abrasive particle layers, use of lower temperature and pressure presses than in the production of standard polycrystalline compacts may be enabled. Alternatively, it may be possible to extend the serviceable life of the existing high pressure apparatus by operating under less demanding conditions than required for in situ processes.

Polycrystalline diamond compacts which may be supported in accordance with the present invention are well-known in the art and methods for making such polycrystalline diamonds are detailed, for example, in U.S. Pat. No. 3,141,746 and other patents cited above. Briefly, diamond crystals of particles are placed adjacent a source of catalyst or solvent and then subjected to high pressure and high temperature conditions for a time sufficient to bond or sinter the diamond crystals together. While the relative shape of the abrasive mass and catalyst can be varied, typically the abrasive mass will be cylindrical and the catalyst will be a disk placed on top of or below the diamond mass or an annulus which surrounds the cylinder of abrasive crystals. The catalyst or solvent generally is cobalt, nickel, or iron with cobalt being preferred. Alternatively, the catalyst can be selected from any known catalyst which also includes ruthenium, rhodium, palladium, platinum, chromium, manganese, tantalum, osmium, or iridium. Mixtures and alloys (e.g. low melting alloys) of the foregoing metals, especially the preferred metals, can be used and may be preferred on occasion. The catalyst may be admixed with the abrasive crystals in addition to or instead of being a separate mass placed adjacent to the abrasive crystals.

Cubic boron nitride compacts are manufactured in a manner quite similar to that described for polycrystalline diamond compacts. In the case of CBN compacts, however, the metal swept into the CBN crystal mass may or may not be a catalyst or solvent for CBN recrystallization. The HP/HT sintering process for CBN is carried out in the CBN stable region which is in the range of pressure and temperature conditions under which the CBN is thermodynamically stable. Methods for making CBN compacts can be found in U.S. Pat. Nos. 3,233,988, 3,743,489, and 3,767,371.

Referring to the porous polycrystalline diamond compacts, reference again is made to U.S. Pat. Nos. 4,224,380 and 4,288,248 which provide a full disclosure thereof. The porous polycrystalline diamond compact comprises diamond particles which comprise between about 70% and 95% by volume of the compact. The metallic phase of sintering aid material is present substantially uniformly throughout the compact and is in a minor amount, typically ranging from about 0.05 to about 3% by volume of the compact. A network of interconnected empty pores are dispersed through the compact and are defined by the diamond particles and the metallic phase. Such pores generally comprise between about 5% and 30% by volume of the compact. The porous compact is comprised of self-bonded diamond particles typically ranging in size from between about 1 and 1,000 microns. The other two types of thermally-stable polycrystalline compacts reported in the art wherein silicon or silicon/nickel essentially replace the empty pore structure of porous polycrystalline diamond compacts are described in the citations referenced above.

Re-sintered polycrystalline CBN compacts, disclosed in U.S. Pat. No. 4,673,414, are made by sintering substantially catalyst-free boron-rich polycrystalline cubic boron nitride particles in an HP/HT apparatus. The particles are subjected to a pressure and temperature adequate to re-sinter the particles, the temperature being below the CBN reconversion temperature. The pressure typically is in excess of about 45 Kbars and the temperature ranges from at least about 1500° C. to below the CBN reconversion temperature. Direct conversion CBN compacts, disclosed in U.S. Pat. No. 4,188,194, are made by placing preferentially oriented pyrolytic hexagonal boron nitride in a reaction cell. The boron nitride is substantially free of catalytically active materials and is subjected to a pressure of between about 50 and 100 Kbars at a temperature of at least 1800° C. and within the cubic boron nitride stable region of the boron nitride phase diagram.

The cemented carbide support advantageously is comprised of a material selected from the group consisting of cemented tungsten carbide, titanium carbide, tungsten-molybdenum carbide, and tantalum carbide, wherein the metal bond material for the carbide is selected from the group consisting of cobalt, nickel, iron, and mixtures thereof, an elemental metal which forms a stable nitride or boride, and a metal alloy which forms a stable nitride or boride. Cobalt is the bond material of choice in the art as is use of cobalt-cemented tungsten carbide supports.

Figure 2:
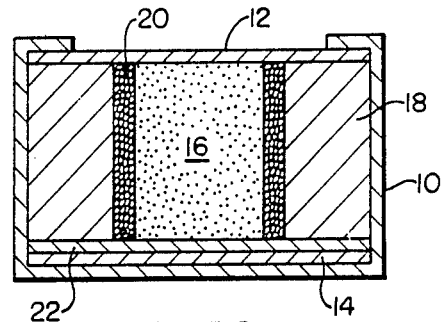

With respect to the reaction cell configurations depicted at FIGS. 1-5, enclosure 10 comprises a refractory metal such as molybdenum, tantalum, titanium, tungsten, zirconium, etc. Shield disks 12 and 14 similarly are comprised of a refractory metal in conventional fashion. FIGS. 1 and 2 depict wire drawing die configurations wherein polycrystalline core 16 is to be supported by carbide annulus 18. Interposed in the annular space between support 18 and core 16 is layer 20 comprising relatively large diamond or CBN crystals having the largest dimension of between about 30 and 500 micrometers. In the configuration depicted at FIG. 1, the catalyst/sintering aid for layer 20 is contained in metal cemented carbide annulus 18, though catalyst/sintering aid material may be intermixed in layer 20 as is necessary, desirable, or convenient in conventional fashion. In FIG. 2, catalyst/sintering aid layer 22 is positioned to permit axial diffusion through layer 20 as such axial diffusion process is disclosed in U.S. Pat. No. 4,534,934. Such axial diffusion process also admits to radial diffusion of catalyst/sintering aid material from annulus 18. When disk 22 is formed of a catalyst alloy which has a melting point lower than any catalyst content in annulus 18, then a selective directional sweep-through or diffusion process results, as disclosed in commonly-assigned U.S. Ser. No. 697,669, filed Feb. 4, 1985, now U.S. Pat. No. 4,778,486.

Figure 3:
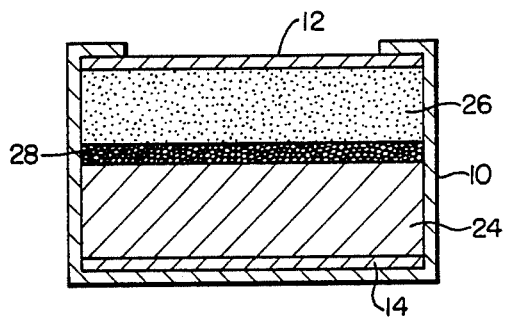
Figure 4:
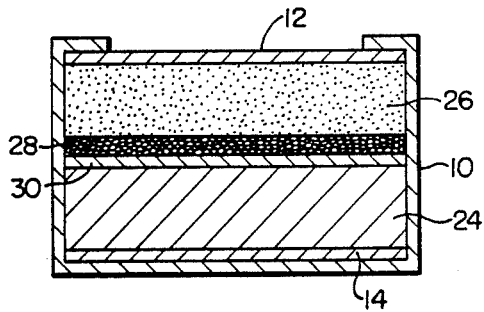
Figure 5:
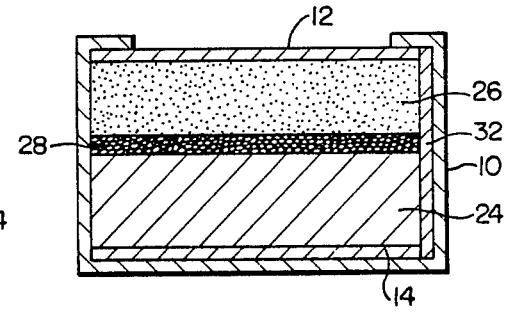

FIGS. 3-5 depict right cylindrical configurations for the compact and support. In FIG. 3, cylindrical carbide support 24 is placed within shield cup 10 for supporting sintered polycrystalline cylindrical compact 26. Interposed therebetween is layer 28 composed of diamond or CBN crystals. Catalyst/sintering aid material is provided from support 24 in conventional fashion. In FIG. 4, disk 30 is interposed between layer 28 and support 24. Disk 30 comprises catalyst/sintering aid material for sweep-through or diffusion into crystalline layer 28. In FIG. 5, the directional catalyst alloy process of U.S. Ser. No. 697,669 U.S. Pat. No. 4,778,486 again is employed by using catalyst/sintering aid disk 32. It will be appreciated that a variety of additional configurations can be conceived of in connection with carrying out the fabrication process of the present invention.

The following Example shows how the present invention has been practiced, but should not be construed as limiting. In this application, all units are in the metric system, unless otherwise expressly indicated, and all citations are expressly incorporated herein by reference.

EXAMPLE

A thermally-stable cylindrical diamond compact (0.205 inch outside diameter by 0.138 inch thick) was placed inside a WC annulus (0.562 in. outside diameter, 0.270 annulus diameter, 0.350 inch high) with coarse diamond crystals (230/270 mesh; 0.0021/0.0025 inch) filled in around the compact core. A cell configuration as in FIG. 2 was used with Mo (0.004 in.)/Co (0.016 in.) layers on one end and a Zr enclosure.

The cell was subjected to conventional processing estimated to be about 1370° C. and 55 kbar for 10 minutes. The recovered compact was examined by X-ray radiography and microscopy, and no damaged or defectively bonded areas were evident. Also, there was no evidence of cobalt diffusion into the thermally-stable diamond core. A sample of this product also was heated to 870° C. for ten minutes in an argon atmosphere and no thermal damage (cracks, pits, or soft spots) was observed from the core or WC/diamond interface.

The same bonding precedure was used with a direct-conversion CBN core and coarse diamond layer (230/270 mesh). Again, X-ray radiography and a microscope examination showed no evidence of damaged or defective areas.

I claim:

1. A process for fabricating a supported polycrystalline diamond or CBN bi-layer compact which comprises:

(a) forming a sintered polycrystalline diamond or CBN compact having a surface;

(b) separately forming a cemented carbide support having a support surface;

(c) mating said compact and said support at their respective surfaces with a layer of diamond or CBN crystals having a largest dimension of between about 30 and 500 micrometers interposed between said surfaces;

(d) providing a source of catalyst/sintering aid material in association with said layer of crystals;

(e) subjecting said mated compact and support to HP/HT conditions and for a time adequate for converting said diamond or CBN crystals into a polycrystalline diamond or CBN layer and for providing a support polycrystalline bi-layer compact comprising at least two polycrystalline layers.

2. The process of claim 1 wherein said sintered compact having a surface comprises a thermally-stable compact.

3. The process of claim 1 wherein said catalyst/sintering aid material is selected from the group consisting of cobalt, nickel, iron, ruthenium, rhodium, palladium, platinum, chromium, manganese, tantalum, osmium, iridium, alloys thereof, and mixtures thereof.

4. The process of claim 1 wherein said layer interposed between said surfaces comprises diamond crystals.

5. The process of claim 1 wherein said cemented carbide support is selected from the group consisting of cemented tungsten carbide, titanium carbide, tungsten-molybdenum carbide, and tantalum carbide, wherein the metal bond material for the carbide is selected from the group consisting of cobalt, nickel, iron, and mixtures thereof, an elemental metal which forms a stable nitride or boride, and a metal alloy which forms a stable nitride or boride.

6. The process of claim 1 wherein said HP/HT conditions comprise a temperature ranging from between about 1000° and 2000° C. and a pressure in excess of 40 kbars.

7. The process of claim 1 wherein said catalyst/sintering aid material source is in admixture with said layer of crystals.

8. The process of claim 1 wherein said catalyst/sintering aid material source is placed adjacent said layer of crystals.

9. The process of claim 1 wherein said compact having a surface comprises a direct converted CBN compact.

10. The process of claim 1 wherein said compact having a surface is a thermally-stable compact or direct converted CBN compact; said catalyst/sintering aid material is selected from the group consisting of cobalt, nickel, and iron; said cemented carbide support is selected from the group consisting of cemented tungsten carbide, titanium carbide, tungsten-molybdenum carbide, and tantalum carbide, wherein the metal bond comprises cobalt; and said HP/HT conditions comprise a temperature ranging from between about 1000° and 1500° C. and a pressure of between about 40 and 60 kbars.

11. The process of claim 1 wherein said cemented carbide support comprises an annular cemented carbide support and said sintered polycrystalline diamond or CBN compact having a surface is interposed therewith.

12. The process of claim 1 wherein said cemented carbide support is cylindrical and said sintered polycrystalline diamond or CBN compact having a surface is cylindrical.

* * * * *